(12) United States Patent
Ali et al.

(10) Patent No.: US 10,164,969 B2
(45) Date of Patent: Dec. 25, 2018

(54) COMPUTER SECURITY SYSTEM AND METHOD

(71) Applicant: HEWLETT-PACKARD DEVELOPMENT COMPANY, L.P., Houston, TX (US)

(72) Inventors: Valuiddin Ali, Cypress, TX (US); Manuel Novoa, Cypress, TX (US); Matthew J. Wagner, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/403,325

(22) Filed: Jan. 11, 2017

(65) Prior Publication Data
US 2017/0126655 A1    May 4, 2017

Related U.S. Application Data

(63) Continuation of application No. 10/780,398, filed on Feb. 17, 2004, now Pat. No. 9,589,117.

(51) Int. Cl.
| | |
|---|---|
| *G06F 21/00* | (2013.01) |
| *H04L 29/06* | (2006.01) |
| *G06F 21/31* | (2013.01) |
| *G06F 17/30* | (2006.01) |
| *G06F 21/60* | (2013.01) |

(52) U.S. Cl.
CPC ...... *H04L 63/083* (2013.01); *G06F 17/30994* (2013.01); *G06F 21/31* (2013.01); *G06F 21/602* (2013.01); *H04L 63/062* (2013.01); *H04L 63/10* (2013.01); *G06F 2221/2103* (2013.01); *G06F 2221/2131* (2013.01)

(58) Field of Classification Search
None
See application file for complete search history.

(56) References Cited

U.S. PATENT DOCUMENTS

| | | |
|---|---|---|
| 5,091,939 A | 2/1992 | Cole et al. |
| 5,892,906 A | 4/1999 | Chou et al. |
| (Continued) | | |

FOREIGN PATENT DOCUMENTS

| | | |
|---|---|---|
| EP | 1111495 | 6/2001 |
| JP | 04-030242 | 2/1992 |
| (Continued) | | |

OTHER PUBLICATIONS

JP Non-Patent Reference; Not Translated; May 12, 2003; vol. 433; 17 Pages.

(Continued)

*Primary Examiner* — Jeffery L Williams
(74) *Attorney, Agent, or Firm* — HPI Patent Department

(57) ABSTRACT

A computer security system comprises a security module adapted to control access to a secure computer resource by a user via a client based on verification of a security credential provided by the user. The computer security system also comprises verification data disposed on the client and accessible by the security module. The security module is adapted to enable the user to recover the security credential based on a response received from the user associated with the verification data.

11 Claims, 2 Drawing Sheets

(56) References Cited

U.S. PATENT DOCUMENTS

| | | | |
|---|---|---|---|
| 6,067,625 A * | 5/2000 | Ryu | G06F 21/31 |
| | | | 726/18 |
| 6,160,873 A | 12/2000 | Truong et al. | |
| 6,178,508 B1 | 1/2001 | Kaufman | |
| 6,401,208 B2 | 6/2002 | Davis | |
| 6,546,489 B1 | 4/2003 | Frank | |
| 6,618,810 B1 | 9/2003 | Dirie | |
| 6,625,730 B1 | 9/2003 | Angelo | |
| 6,636,973 B1 | 10/2003 | Novoa | |
| 6,662,300 B1 | 12/2003 | Peters | |
| 6,668,323 B1 | 12/2003 | Challener et al. | |
| 6,725,379 B1 | 4/2004 | Dailey | |
| 6,725,382 B1 | 4/2004 | Thompson et al. | |
| 6,754,349 B1 | 6/2004 | Arthan | |
| 6,862,681 B2 | 3/2005 | Cheston et al. | |
| 6,978,385 B1 | 12/2005 | Cheston et al. | |
| 6,986,039 B1 | 1/2006 | Leah et al. | |
| 6,996,719 B2 | 2/2006 | Riordan | |
| 7,062,623 B2 | 6/2006 | Vogt et al. | |
| 7,188,086 B2 | 3/2007 | Shinzaki et al. | |
| 2001/0034725 A1 | 10/2001 | Park et al. | |
| 2002/0010757 A1 | 1/2002 | Granik et al. | |
| 2002/0180581 A1 | 12/2002 | Kamiwada et al. | |
| 2002/0194140 A1 | 12/2002 | Makuck | |
| 2003/0004881 A1 | 1/2003 | Shinzaki et al. | |
| 2003/0070102 A1 * | 4/2003 | Kondo | G06F 21/31 |
| | | | 726/23 |
| 2003/0084275 A1 | 5/2003 | David et al. | |
| 2003/0105683 A1 | 6/2003 | Fratarcangeli et al. | |
| 2004/0030932 A1 | 2/2004 | Juels et al. | |
| 2004/0078334 A1 | 4/2004 | Malcolm et al. | |
| 2004/0078775 A1 | 4/2004 | Chow et al. | |
| 2004/0133812 A1 | 7/2004 | Ohmori et al. | |
| 2005/0138399 A1 | 6/2005 | Cheston et al. | |

FOREIGN PATENT DOCUMENTS

| | | |
|---|---|---|
| JP | 05-173893 | 7/1993 |
| JP | 10-173972 | 6/1998 |
| JP | 10-177551 | 6/1998 |
| JP | 10-187618 | 7/1998 |
| JP | 11-212922 | 8/1999 |
| JP | 2001-236318 | 8/2001 |
| JP | 2001-290776 | 10/2001 |
| JP | 2003-085143 | 3/2003 |

OTHER PUBLICATIONS

JP Office Action; dated Jan. 20, 2010; 4 Pages.
European Patent Office; Communication pursuant to Article 94(3) EPC; Application No. 05250841.3; dated Jan. 13, 2011; 5 Pages.
Communication including International Search Report dated Jun. 6, 2007.

* cited by examiner

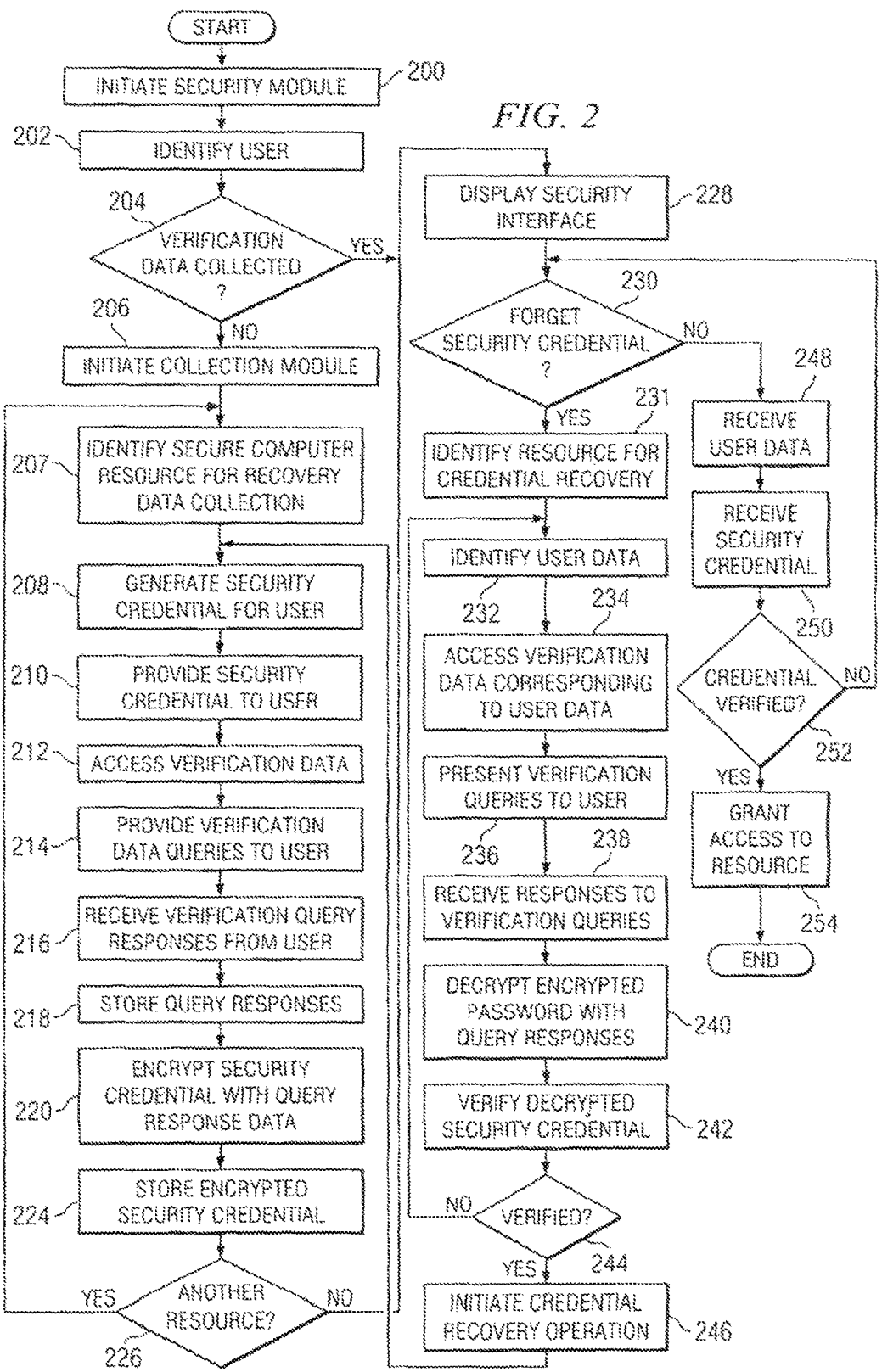

COMPUTER SECURITY SYSTEM AND METHOD

BACKGROUND

Passwords and other types of security credentials are generally required to access protected or secured computer resources. For example, a security credential may be required to access a secure computer network, unlock a hard drive, or initiate booting or power-on of a computer system.

However, security credentials may comprise long and/or complex alphanumeric character strings or other types of information that may be difficult to remember by a user attempting to access a secure computer resource. When a security credential for accessing a secure computer resource is forgotten, the user generally requires the assistance of support personnel to either recover or reset the security credential (i.e., via the Internet, intranet, or by telephone communication). However, the corresponding support personnel may be unavailable to assist the user in recovering or resetting the security credential, or contacting the corresponding support personnel may be inconvenient and time-consuming. Additionally, obtaining the assistance of support personnel may be increasingly difficult if access to the secure computer resource is required or helpful in obtaining the assistance of the support personnel. Further, unmanaged security credentials (i.e., security credentials not stored in any central repository) are generally unrecoverable centrally by information technologies personnel.

SUMMARY

In accordance with one embodiment of the present invention, a computer security system comprises a security module adapted to control access to a secure computer resource by a user via a client based on verification of a security credential provided by the user. The computer security system also comprises verification data disposed on the client and accessible by the security module. The security module is adapted to enable the user to recover the security credential based on a response received from the user associated with the verification data.

In accordance with another embodiment of the present invention, a computer security method comprises receiving a request at a client to access a secure computer resource where a security credential is required from the user to access the secure computer resource. The method also comprises presenting verification data disposed on the client to the user and enabling the user to recover the security credential based on a response received from the user to the verification data.

BRIEF DESCRIPTION OF THE DRAWINGS

For a more complete understanding of the present invention and the advantages thereof, reference is now made to the following descriptions taken in connection with the accompanying drawings in which:

FIG. 2 is a flow chart illustrating an embodiment of a computer security method in accordance with the present invention.

DETAILED DESCRIPTION OF THE DRAWINGS

Figure 1:
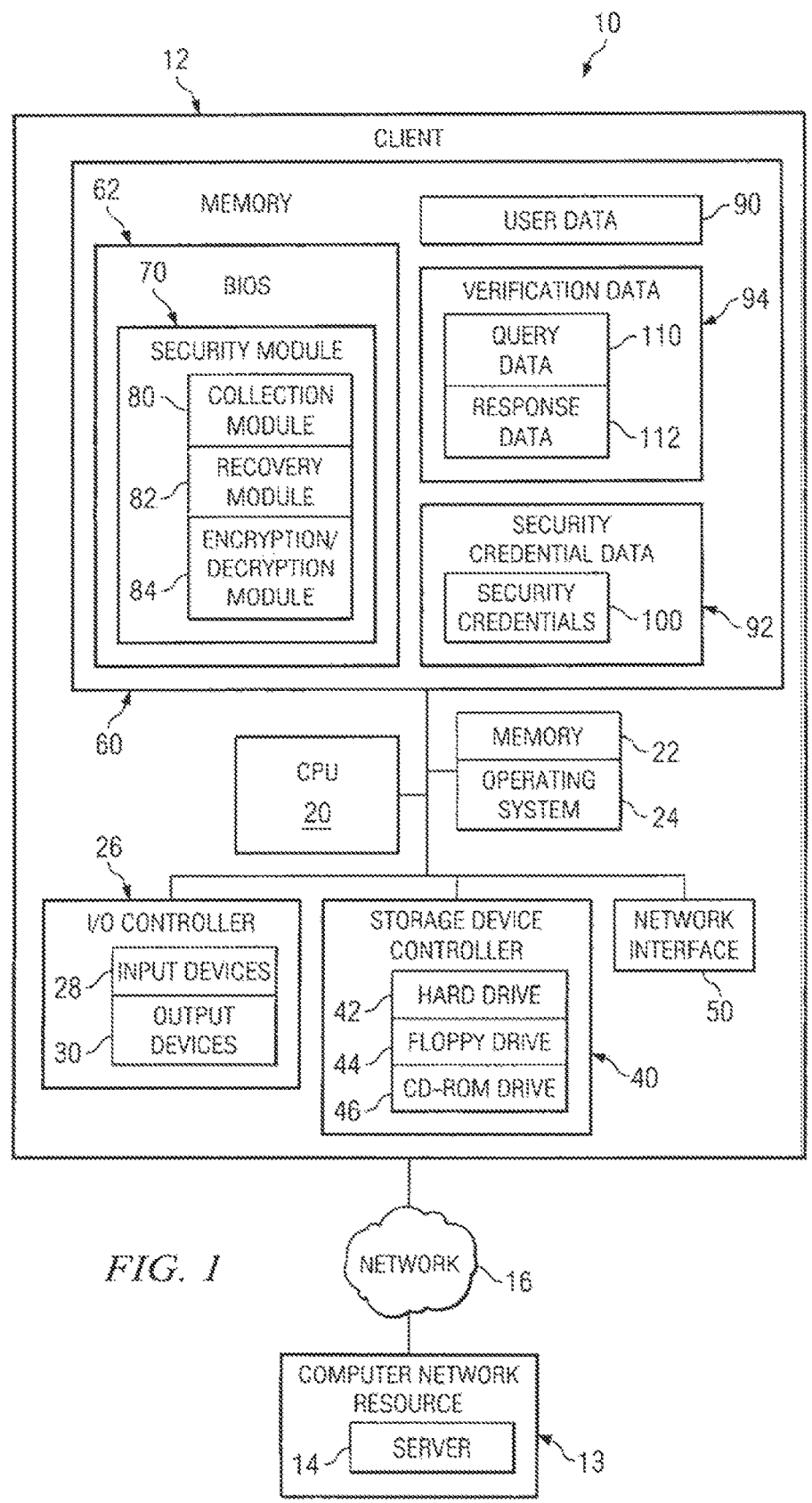
FIG. 1 is a diagram illustrating an embodiment of a computer security system in accordance with the present invention.

The preferred embodiments of the present invention and the advantages thereof are best understood by referring to FIGS. 1 and 2 of the drawings, like numerals being used for like and corresponding parts of the various drawings.

FIG. 1 is a diagram illustrating an embodiment of a computer security system 10 in accordance with the present invention. Briefly, system 10 provides a self-service security credential recovery mechanism to enable a user of a client 12 to retrieve and/or reset a security credential associated with a secure computer resource, or have a security credential associated with a secure computer resource automatically reset, without relying on a computer system or network external to the user's computer system. In the embodiment illustrated in FIG. 1, system 10 comprises a client 12 coupled to a computer network resource 13, such as a server 14, via a communications network 16. Client 12 may comprise a desktop computer, work station, notebook computer, personal digital assistant, a type of peripheral device such as a telephone or printer, or any other type of computing device. In the embodiment illustrated in FIG. 1, client 12 is illustrated as a component of a computer network such that client 12 may be used to access server 14 via a wired or wireless communication network 16 such as, but not limited to, a local area network, wide area network, or a global information network such as the Internet. However, it should be understood that client 12 may also comprise a stand-alone or non-networked device such as a personal work station or desktop computer.

As illustrated in FIG. 1, client 12 comprises a processor or central processing unit (CPU) 20; a memory 22 having an operating system 24; an input/output (I/O) controller 26 for controlling input devices 28 and output devices 30; a storage device controller 40 for controlling the retrieval and storage of data associated with various types of data storage devices such as, but not limited to, a hard drive 42, a floppy drive 44, and an optical media drive such as a compact disc read-only memory (CD-ROM) drive 46; and a network interface 50 for controlling access and communications with various types of network resources. Input devices 28 comprise any type of device for inputting information to client 12 such as, but not limited to, a keyboard, mouse, trackpad, modem, or microphone. Output devices 30 comprise any type of device for outputting information from client 12 such as, but not limited to, a display monitor, speakers, or a printer.

As illustrated in FIG. 1, client 12 also comprises a memory 60 having a basic input/output system (BIOS) program 62 for performing booting or starting operations such as system initialization and tests and peripheral component registration operations. For example, upon booting or starting of client 12, CPU 20 passes control to BIOS 62 to identify and ascertain the hardware and software resources connected to, or forming a part of, client 12. BIOS 62 also generally verifies that the connected hardware components are working properly and loads all or a portion of operating system 24 into memory 22. All or a portion of BIOS 62 may be stored in various types of memory 60.

In the embodiment illustrated in FIG. 1, client 12 also comprises a security module 70 for controlling access by client 12 to various types of secure or protected computer resources. For example, a secure computer resource may comprise the client 12 itself such that control of a booting operation of client 12 is managed through security module 70. Additionally, the secure computer resource may comprise a component of client 12 such as, but not limited to, a hard drive or peripheral component coupled to client 12. The secure computer resource may also comprise a computer communications network coupled to client 12 or networked component. Security module 70 may comprise software, hardware, or a combination of software and hardware. In the embodiment illustrated in FIG. 1, security module 70 illustrated as part of BIOS 62 for controlling booting or initialization of client 12. However, it should be understood that security module 70 and/or components of security module 70 may be otherwise stored on client 12 to accommodate a desired application (e.g., apart from BIOS 62). For example, as will be described in greater detail below, security module 70 may also be used to control access to a secure network resource 13 or control access to an available computer communications network 16.

As illustrated in FIG. 1, security module 70 comprises a collection module 80, a recovery module 82, and an encryption/decryption module 84. Briefly, collection module 80 is used to acquire various types of information from a user of client 12 to enable the user of client 12 to recover a password or other type of security credential for accessing or initiating operations associated with a secure computer resource independent of a computer resource external to client 12. Recovery module 82 is used to enable the user of client 12 to retrieve or reset a password or other type of security credential for accessing or initiating operations associated with a secure computer resource, or have a password or other type of security credential for accessing or initiating operations associated with a secure computer resource automatically reset, without relying on a computer resource external to client 12. Encryption/decryption module 84 is used to encrypt, decrypt, and/or otherwise perform hashing or other types of information transformation operations to enable secure information processing and provide access and initiation control for a computer resource.

As illustrated in FIG. 1, memory 60 also comprises user data 90, security credential data 92, and verification data 94. User data 90 comprises information associated with a user of client 12 such as, but not limited to, the identity of the user or a username. For example, user data 90 may comprise a login username or other type of information associated with a particular user of client 12 such that the identity of the user accessing or using client 12 may be determined. Security credential data 92 comprises information associated with enabling the user of client 12 to access or initiate operations associated with a secure computer resource. For example, security credential data 92 may comprise a password, personal identification number (PIN), biometric indicator, such as a fingerprint, or any other type of credential used to verify or authenticate the identity of the user of client 12 corresponding to user data 90. The passwords, PINs or other types of secure information are stored as security credentials 100.

Verification data 94 comprises information associated with a query/response mechanism to enable the user of client 12 to independently recover a security credential 100 independent of a computer resource external to client 12. For example, as used herein, "recovering" security credential 100 includes enabling the user to independently retrieve security credential 100, enabling the user to independently reset security credential 100, and/or automatically having security credential 100 reset for the user by security module 70 without assistance from support personnel or an external computer resource. In the embodiment illustrated in FIG. 1, verification data 94 comprises query data 110 and response data 112. Query data 110 comprises information associated with queries or challenge phrases presentable to the user of client 12 which, based on an acceptable response from the user to the query, will enable the user to independently recover security credential 100. Response data 112 comprises information associated with acceptable or proper responses to query data 110. Additionally, user data 90, verification data 94, and security credential 92 are illustrated in FIG. 1 as being stored in memory 60 to be associated with or otherwise accessed by BIOS 62 to accommodate a secure booting operation of client 12. However, it should be understood that user data 90, verification data 94, and security credential 92 may be otherwise located or retrievable for other secure computer resource control applications.

In some embodiments, for a secure client 12 booting or initialization application, BIOS 62 is configured to automatically initiate or activate collection module 80 during an initial client 12 access by a particular user to acquire or otherwise determine verification data 94 associated with the user. For example, based on user data 90 received from a particular user during an initial login operation, security module 70 may access user data 90, verification data 94 and/or security credential data 92 to determine whether response data 112 for the particular user has been acquired. If response data 112 has been previously acquired for the user, BIOS 62 may continue with normal operations. If response data 112 has not been previously acquired for the user, query data 110 is presented to the user. Query data 110 may comprise a predetermined quantity of predetermined queries or challenge phrases presentable to the user such that responses to the queries 110 are received by collection module 80 from the user and stored as response data 112. System 10 may be configured to acquire or otherwise obtain and determine verification data 94 using a variety of different methods. For example, query data 110 may be predefined and automatically presented to the user to acquire response data 112. Alternatively, or additionally, the user may have the option of selecting particular queries 110 from a list of presented queries 110 to use as verification data 94. Further, the user may have the option of defining queries 110 to be used as verification data 94 and inputting response data 112 for the designated queries 112. Verification data 94 may also be acquired or otherwise determined at a variety of levels (e.g., provided to BIOS 62 through any operating system layer software driver or application).

In some embodiments of the present invention for a secure client 12 booting or initialization application, BIOS 62 is configured to automatically initiate or activate security module 70 to verify or authenticate a security credential 100 prior to booting client 12. Security credential 100 may be predetermined and stored in memory 60 by an administrator. Security credential 100 may also be derived from verification data 94 or randomly generated by security module 70 and presented or displayed to the user during an initial generation of the security credential 100. Thus, during subsequent sessions on client 12 by a user, booting or initialization of client 12 will begin in response to verification of security credential 100 provided by the user.

In operation, according to some embodiments, if the user has forgotten security credential 100, security module 70 automatically initiates recovery module 82 to enable the user to independently recover security credential 100. However, it should also be understood that system 10 may be configured to correspond with defined policies such that recovery module 82 may be available for particular users and/or particular secure computer resources. Thus, in operation, recovery module 82 accesses verification data 94 and presents or displays to the user at least one query 110 associated with the user. A response to query 110 is received by recovery module 82 and verified with response data 112. If the response to the query 110 received from the user corresponds with response data 112, BIOS 62, for example, initiates booting of client 12. If the responses to the query 110 received from the user does not correspond to response data 112, BIOS 62 refuses, for example, client 12 booting.

Security module 70 may also be configured to present to the user a listing of the different types of security credentials recoverable by the user or otherwise require the user to identify the type of security credential desired to be recovered (i.e., power-on password, drive lock password, or BIOS administration password).

Additionally, encryption/decryption module 84 may be used to encrypt and/or decrypt security credential 100 and/or verification data 94. For example, in some embodiments, encryption/decryption module 84 is used to encrypt security credential 100 with response data 112 to obtain an encrypted security credential 100. Upon activation of recovery module 82, encryption/decryption module 84 is used to decrypt an encrypted security credential 100 with responses received from the user to queries 110. Recovery module 82 is used to verify the decrypted security credential 100 using the responses received from the user in response to queries 110. However, it should also be understood that other encryption/decryption methods may be used for protecting or otherwise securing information associated with accessing a secure computer resource.

Additionally, in some embodiments, security module 70 is configured to accommodate resetting of security credential 100 by a user without relying on a computer resource external to client 12. For example, in some embodiments, queries 110 are presented or displayed to a user of client 12. The responses received from the user to queries 110 are verified with response data 112 via security module 70. If the responses to the queries 110 received from the user correspond to response data 112 stored in memory 60, recovery module 82 is configured to enable the user to reset security credential 100 or, alternatively, recovery module 82 may be configured to automatically generate a new security credential 100 for the user.

Thus, in operation, if a user forgets a security credential 100 for accessing or initializing a secure computer resource, security module 70 presents to the user at least one query 110 based on predetermined or previously received verification data 94. Recovery module 82 compares a response to query 110 received from the user with response data 112 for authorizing the user to recover or reset security credential 100. Thus, for a booting or client 12 initialization application, security module 70 may be initiated during BIOS 62 initialization such that the user of client 12 may independently recover or reset a security credential 100 for booting client 12 without external assistance from another computer resource or support personnel.

As described above, security module 70 may also be used for other applications to control access or initialization of a secure computer resource. For example, security module 70 may also be used to control access by client 12 to a network 16 or networked computer resources 13. For example, security credential 100 provided by a user may enable the user to access network 16 and/or a secure computer resource 13. However, if the user of client 12 forgets security credential 100 for accessing network 16 and/or resource 13, security module 70 is initiated to enable the user of client 12 to recover or reset security credential 100. For example, as described above, a response received from the user to at least one query 110 is verified or authenticated with response data 112 stored in memory 60 to enable the user to recover or reset security credential 100. Thus, the user may independently recover or reset security credential 100 without relying on support personnel and without relying on an external computer resource such as network 16 and/or resource 13.

FIG. 2 is a flow chart illustrating an embodiment of a computer security method in accordance with the present invention. The method begins at block 200, where security module 70 is initiated. Security module 70 may be initiated in response to a user request to access a particular secure computer resource, automatically during a booting operation, in response to a user requesting security module 70 activation, or another desired application. At block 202, security module 70 identifies the user of client 12. For example, system 10 may be configured to accommodate multiple users such that security module 70 receives or otherwise accesses user data 90 to determine an identity of the particular user of client 12.

At decisional block 204, a determination is made whether the user of client 12 has previously input verification data 94 in the form of response data 112 and/or query data 110. If the user of client 12 has not previously input verification data 94, the method proceeds to block 206 where security module 70 initiates a data acquisition operation using collection module 80. At block 207, security module 70 identifies the secure computer resource for the data acquisition operation. For example, system 10 may be configured such that a data acquisition operation is processed for each secure computer resource available via client 12. System 10 may be configured to provide a listing of the secure computer resources for user selection for a particular data acquisition operation, automatically perform a data acquisition operation for each secure computer resource, or be otherwise configured to acquire data from the user for any or all available secure computer resources via client 12.

At block 208, security module 70 generates security credential 100 for the user for the corresponding computer resource. At block 210, security module 70 provides to the user the security credential 100, such as an authentication password, to the user for accessing or initiating a secure computer resource or operation. It should also be understood that a particular security credential 100 may also be provided by the user, received by security module 70 and stored as security credential 100 in memory 60. At block 212, collection module 80 accesses verification data 94. At block 214, collection module 80 presents to the user queries 110. At block 216, collection module 80 receives responses to the queries 110 and stores the responses as response data 112 at block 218.

At block 220, encryption/decryption module 84 encrypts the security credential 100 with response data 112. At block 224, security module 70 stores the encrypted security credential 100 in memory 60. At decisional block 226, a determination is made whether a data acquisition or collection procedure is to be completed for another computer resource. If a data collection procedure is to be completed for another computer resource, the method returns to block 207. If another data collection procedure is not required, the method proceeds to block 228.

At decisional block 204, if a determination is made that the user has previously input verification data 94, the method proceeds from block 204 to block 228, where security module 70 displays a security interface for receiving input of security credential 100 from the user. At decisional block 230, a determination is made whether the user has forgotten security credential 100 or has incorrectly provided the security credential 100. If the user has forgotten or incorrectly provided the security credential 100, the method proceeds to block 231, where security module 70 identifies the computer resource for which credential recovery is requested. For example, system 10 may be configured to provide a different security credential 100 and/or a different set of queries 110 and responses 112 for each secure computer resource. At block 208, security module 70 receives or accesses user data 90 indicating the identity of the user of client 12. At block 234, recovery module 82 accesses verification data 94 corresponding to the user based on user data 90. At block 236, recovery module 80 generates and presents queries 110 to the user. At block 238, recovery module 80 receives responses from the user to the queries 110.

At block 240, encryption/decryption module 84 decrypts an encrypted security credential 100 using response information received from the user to queries 100. At block 242, security module 70 verifies the decrypted security credential 100. At decisional block 244, a determination is made whether verification of the decrypted security credential 100 is obtained. If the decrypted security credential is not verified, the method returns to block 232. If the decrypted security credential 100 is verified, the method proceeds from block 244 to block 246, where security module 70 initiates a security credential recovery operation. For example, as described above, security module 70 may be configured to enable the user to independently reset security credential 100, security module 70 may be configured to automatically generate a new security credential for the user, or security module 70 may be configured to enable the user to retrieve the security credential 100. The method proceeds to block 208.

At decisional block 230, if the user has not forgotten the security credential 100, the method proceeds from block 230 to block 248, where security module 70 receives user data 90 from the user. At block 250, security module 70 receives security credential 100 from the user. At decisional block 252, a determination is made whether verification of the security credential 100 is obtained corresponding to user data 90. If the security credential 100 is verified, the method proceeds to block 254, where access is granted to the secure computer resource. If verification of the security credential 100 is not obtained, the method returns to block 230.

Thus, embodiments of the present invention enable a user to independently recover a security credential 100 for accessing a secure computer resource without relying on an external computer resource. Embodiments of the present invention may be applied to secure hard drive access, booting operations, computer network access, and a variety of other computer-based applications.

What is claimed is:

1. A client computer, comprising:
a processor; and
a memory comprising instructions executable by the processor to:
control access to a computer resource by a user based on a password associated with the user;
when the user is unable to input a valid password, present query data to the user;
determine whether a user response to the query data is correct; and
when the user response is correct, display a security interface,
the security interface to perform at least one of: provide the user with the password by decrypting an encrypted version of the password stored on the client computer, and reset the password for the user with a recovery module incorporated in a Basic Input/Output System (BIOS) of the client computer.

2. The client computer of claim 1, wherein, when the decrypting an encrypted version of the password, the processor further to use the user response to the query data as an input to decrypt the encrypted version of the password.

3. The client computer of claim 1, further comprising a network interface, wherein the computer resource is located over a network remote from the client computer.

4. The client computer of claim 1, the processor to present the query data during a booting operation of the client computer.

5. The client computer of claim 1, the processor further to provide the user with an option of selecting query data to which to respond from a list of possible queries.

6. The client computer of claim 1, the processor further to present to the user a listing of different types of security credentials recoverable by the user.

7. The client computer of claim 1, wherein,
when the user response is correct, the processor to provide the user with a valid security credential without assistance from a computer system or device external to the client computer itself.

8. The client computer of claim 7, the processor further to decrypt an encrypted version of the password and provide the user with the decrypted password.

9. The client computer of claim 7, the processor further to reset the password for the user.

10. The client computer of claim 7, the processor further to provide the user with an option of selecting query data to which to respond from a list of possible queries.

11. The client computer of claim 7, the processor further to present to the user a listing of different types of security credentials recoverable by the user.

* * * * *